(12) United States Patent
Lebovitz

(10) Patent No.: US 10,563,683 B2
(45) Date of Patent: Feb. 18, 2020

(54) MAGNETIC MOBILE-DEVICE MOUNT

(71) Applicant: Yona Lebovitz, Monroe, NY (US)

(72) Inventor: Yona Lebovitz, Monroe, NY (US)

(*) Notice: Subject to any disclaimer, the term of this patent is extended or adjusted under 35 U.S.C. 154(b) by 0 days.

(21) Appl. No.: 15/582,352

(22) Filed: Apr. 28, 2017

(65) Prior Publication Data
US 2017/0318697 A1 Nov. 2, 2017

Related U.S. Application Data

(63) Continuation-in-part of application No. 29/595,125, filed on Feb. 24, 2017, now Pat. No. Des. 825,549, and a continuation-in-part of application No. 29/594,954, filed on Feb. 23, 2017, now Pat. No. Des. 825,548, and a continuation-in-part of application No. 29/591,287, filed on Jan. 18, 2017, now Pat. No. Des. 823,847.

(60) Provisional application No. 62/367,449, filed on Jul. 27, 2016, provisional application No. 62/330,591, filed on May 2, 2016.

(51) Int. Cl.
*B60R 11/00* (2006.01)
*F16B 11/00* (2006.01)
*F16B 1/00* (2006.01)

(52) U.S. Cl.
CPC ..... *F16B 11/006* (2013.01); *F16B 2001/0035* (2013.01)

(58) Field of Classification Search
CPC ..... B60R 2011/0005; B60R 2011/0063; B60R 2011/007; B60R 2011/0057; B60R 2011/0077
See application file for complete search history.

(56) References Cited

U.S. PATENT DOCUMENTS

| | | | | |
|---|---|---|---|---|
| 5,031,874 A | * | 7/1991 | Shannon | A47G 1/17 248/683 |
| 5,992,807 A | * | 11/1999 | Tarulli | B60R 11/0241 248/205.3 |
| 6,076,790 A | * | 6/2000 | Richter | B60R 11/00 248/206.5 |
| 6,135,408 A | * | 10/2000 | Richter | B60R 11/00 224/183 |
| 6,149,116 A | * | 11/2000 | Won | B60R 11/0241 224/553 |
| 6,502,727 B1 | * | 1/2003 | Decoteau | A45F 5/004 224/162 |

(Continued)

*Primary Examiner* — Bradley Duckworth
(74) *Attorney, Agent, or Firm* — Amster, Rothstein & Ebenstein LLP

(57) ABSTRACT

A magnetic mobile device mount is an apparatus that attaches a mobile device onto a surface. More specifically, the apparatus facilitates the mounting and dismounting of the mobile device by utilizing magnetic force. The apparatus includes a casing, at least one magnet, a magnet-holding fixture, a first adhesive layer, and a ferric plate. The casing is a platform for the mobile device. The casing includes a base and a cover. The base and the cover detachably attach to each other so that the at least one magnet within the casing is accessible. The magnet-holding fixture positions the at least one magnet within the casing. The first adhesive layer attaches the casing onto the desired surface. The ferric plate attaches the mobile device to the casing as the ferric plate is fixed on the mobile device and the at least one magnet magnetically couples to the ferric plate.

9 Claims, 6 Drawing Sheets

(56) References Cited

U.S. PATENT DOCUMENTS

| | | | | |
|---|---|---|---|---|
| 6,888,940 B1* | 5/2005 | Deppen | ............... | B60R 11/0241 |
| | | | | 379/446 |
| 7,374,142 B2* | 5/2008 | Carnevali | ............... | F16M 13/00 |
| | | | | 224/183 |
| 7,431,251 B2* | 10/2008 | Carnevali | ............... | F16M 13/00 |
| | | | | 224/183 |
| 7,568,670 B2* | 8/2009 | Wang | ............... | B60R 11/02 |
| | | | | 248/205.3 |
| 7,862,197 B2* | 1/2011 | Gebhard | ............... | B60Q 1/24 |
| | | | | 248/206.5 |
| 9,369,790 B2* | 6/2016 | Schreiber | ............... | H04R 1/08 |
| 9,397,719 B1* | 7/2016 | Schmidt | ............... | F16M 11/24 |
| 9,573,531 B2* | 2/2017 | Zhang | ............... | B60R 11/02 |
| 9,616,822 B1* | 4/2017 | Hamilton | ............... | B60R 11/0241 |
| 9,800,283 B2* | 10/2017 | Schmidt | ............... | H04B 1/3877 |
| 9,821,724 B2* | 11/2017 | Zhang | ............... | F16M 11/105 |
| 9,845,058 B2* | 12/2017 | Chow | ............... | B60R 11/02 |
| 2005/0121579 A1* | 6/2005 | Rim | ............... | B60R 11/0235 |
| | | | | 248/288.11 |
| 2006/0086873 A1* | 4/2006 | Chen | ............... | B60R 11/02 |
| | | | | 248/206.5 |
| 2010/0317418 A1* | 12/2010 | Zanetti | ............... | B60R 11/02 |
| | | | | 455/575.9 |
| 2014/0355200 A1* | 12/2014 | Thiers | ............... | H04W 88/02 |
| | | | | 361/679.41 |
| 2016/0040825 A1* | 2/2016 | Franklin | ............... | F16M 13/02 |
| | | | | 439/39 |
| 2017/0170858 A1* | 6/2017 | Tiller | ............... | H04B 1/3877 |
| 2017/0214260 A1* | 7/2017 | Kim | ............... | H02J 7/0044 |
| 2017/0264725 A1* | 9/2017 | Holder | ............... | B60R 11/0241 |

* cited by examiner

US 10,563,683 B2

MAGNETIC MOBILE-DEVICE MOUNT

The current application claims a priority to the U.S. Provisional Patent application Ser. No. 62/330,591 filed on May 2, 2016 and a priority to the U.S. Provisional Patent application Ser. No. 62/367,449 filed on Jul. 27, 2016.

FIELD OF THE INVENTION

The present invention relates generally to a mobile device mount. More specifically, the present invention is a magnetic mount for a mobile device that adheres to a desired surface, such as that of a dashboard.

BACKGROUND OF THE INVENTION

With the advancement of mobile technology, smart phones are replacing traditional Global Positioning System (GAPS) devices. Mobile devices are typically mounted onto the dashboard or on a surface near the driver so that the screen of the mobile device and the audio output is both easily seen or heard by the driver.

Conventional mounts are available in a wide variety of forms and may be mounted in a variety of ways. However, these mounts are often cumbersome and inconvenient to use. Suction-type mounts are often unstable and prone to separating from the mounting surface due to the movement of the vehicle. Another type of mount may be secured into a vehicle air vent. These mounts however are block the airflow from the corresponding vent. Current magnetic mounts utilize magnetism to secure a mobile device to the mount. However, the magnetic power of such mounts is often insufficient to effectively secure the mobile device. The present invention serves to improve upon conventional mounts for smart phones and a variety of other mobile devices.

The present invention is a magnetic mobile device mount that is utilized to mount an electronic device to a vehicle dashboard or similar surface. The present invention adheres to a desired surface. The present invention further includes a rubberized surface that prevents the attached mobile device from separating from the present invention unless purposefully removed by the user.

DETAILED DESCRIPTION OF THE INVENTION

All illustrations of the drawings are for the purpose of describing selected versions of the present invention and are not intended to limit the scope of the present invention.

Figure 1:
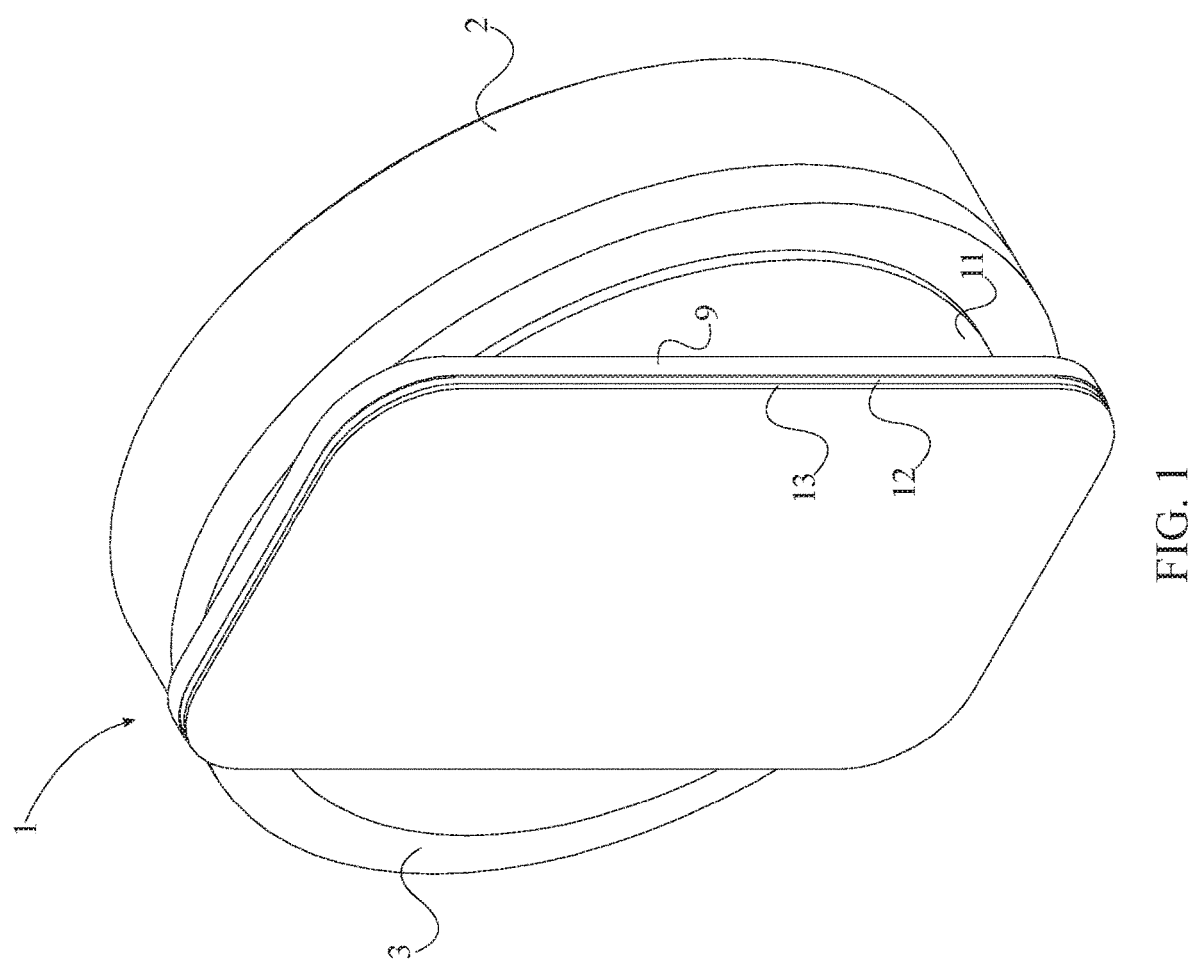
FIG. 1 is a front perspective view of the present invention, wherein the ferric plate is magnetically coupled to the at least one magnet.
Figure 2:
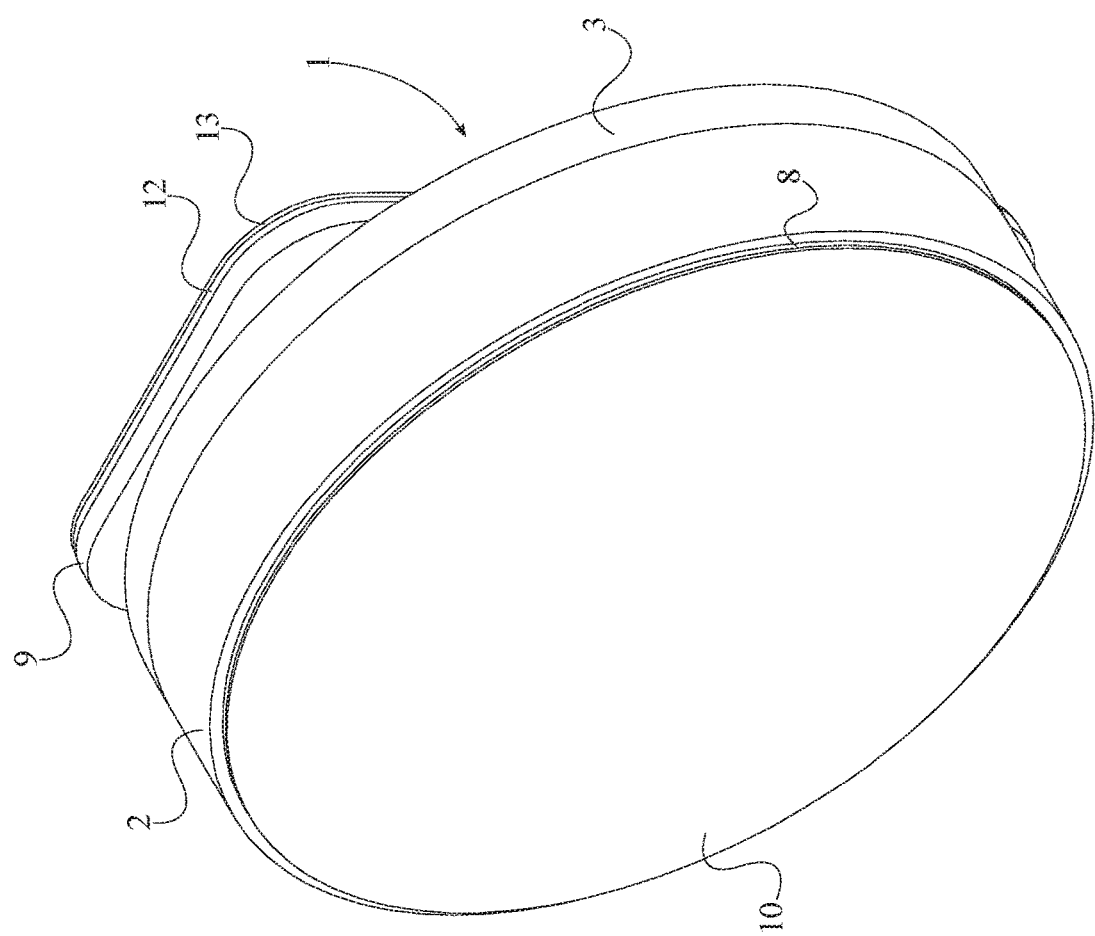
FIG. 2 is a rear perspective view of the present invention, wherein the ferric plate is magnetically coupled to the at least one magnet.

The present invention is a magnetic mobile device mount that allows a user to easily mount and dismount a mobile device to a desired area. The present invention allows a user to safely drive a car and reference to an attached mobile device without having to hold the mobile device while driving the car. The mobile device is typically a smart phone. However, it is understood that the mobile device is not limited to being a smart phone, but may be a variety of electronic devices. The present invention occupies the least amount of space on both the desired surface and the mobile device itself. The present invention does not obstruct the user's view of a display screen of the mobile device as the mobile device is mounted onto the present invention. As illustrated in FIG. 1, FIG. 2, and FIG. 8, the present invention comprises a casing 1, at least one magnet 4, a magnet-holding fixture 5, a first adhesive layer 8, and a ferric plate 9. The casing 1 serves as a platform for which a mobile device may rest. In the preferred embodiment of the present invention, the casing 1 has a disk shape. However, the shape of the casing 1 may be a variety of shapes in alternate embodiments of the present invention. The at least one magnet 4 attaches the ferric plate 9 to the casing 1. The magnet-holding fixture 5 allows the at least one magnet 4 to be removed or interchanged. The first adhesive layer 8 attaches the casing 1 to the desired surface. The ferric plate 9 attaches to the at least one magnet 4 and connects to the mobile device. In the preferred embodiment of the present invention, the ferric plate 9 has a rectangular shape as to mirror the typical rectangular shape of a smart phone. The casing 1 further comprises a base 2 and a cover 3. The base 2 presses against the desired surface and houses the at least one magnet 4. The cover 3 conceals the at least one magnet 4 and upholds the mobile device.

The overall configuration of the aforementioned components allows the present invention to mount onto a desired surface and connect a mobile device to the present invention, thereby mounting the mobile device onto the desired surface. The cover 3 is perimetrically aligned with the base 2 as to contain the at least one magnet 4 and the magnet-holding fixture 5. The base 2 and the cover 3 are detachably attached to each other, as illustrated in FIG. 8, so that the at least one magnet 4 may be accessed by the user. In order to secure the position of the at least one magnet 4 about the desired surface, the magnet-holding fixture 5 is positioned within the casing 1 and recessed into the base 2. In order to prevent the unwanted movement of the at least one magnet 4 within the casing 1, the at least one magnet 4 is mounted into the magnet-holding fixture 5. The casing 1 is positioned in between the first adhesive layer 8 and the ferric plate 9 so that the ferric plate 9 may mount the mobile device onto the desired surface. The casing 1 attaches onto the desired surface as the first adhesive layer 8 is connected across the base 2. The mobile device mounts onto the casing 1 as the ferric plate 9 is magnetically coupled to the at least one magnet 4. The ferric plate 9 may be attached to the mobile device itself or a case that surrounds the mobile device.

Figure 5:
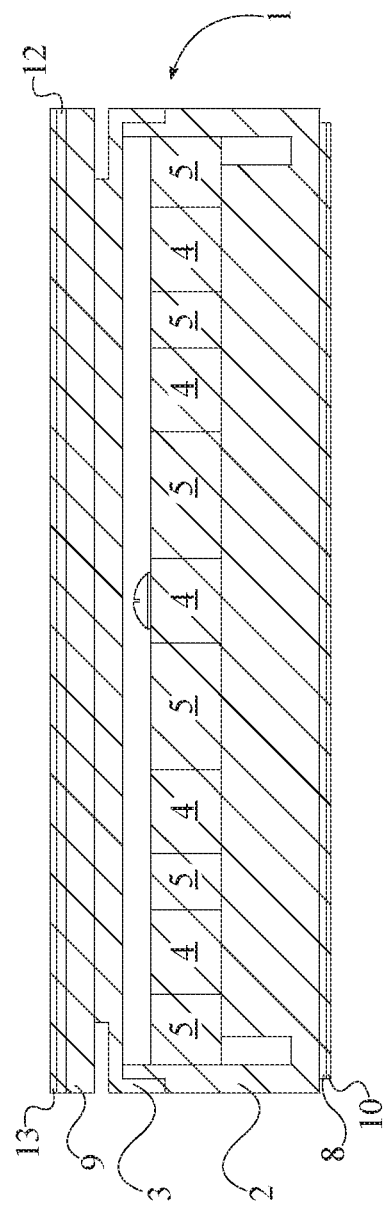
FIG. 5 is a cross-sectional view of the present invention taken along line 5-5 in FIG. 4.
Figure 6:
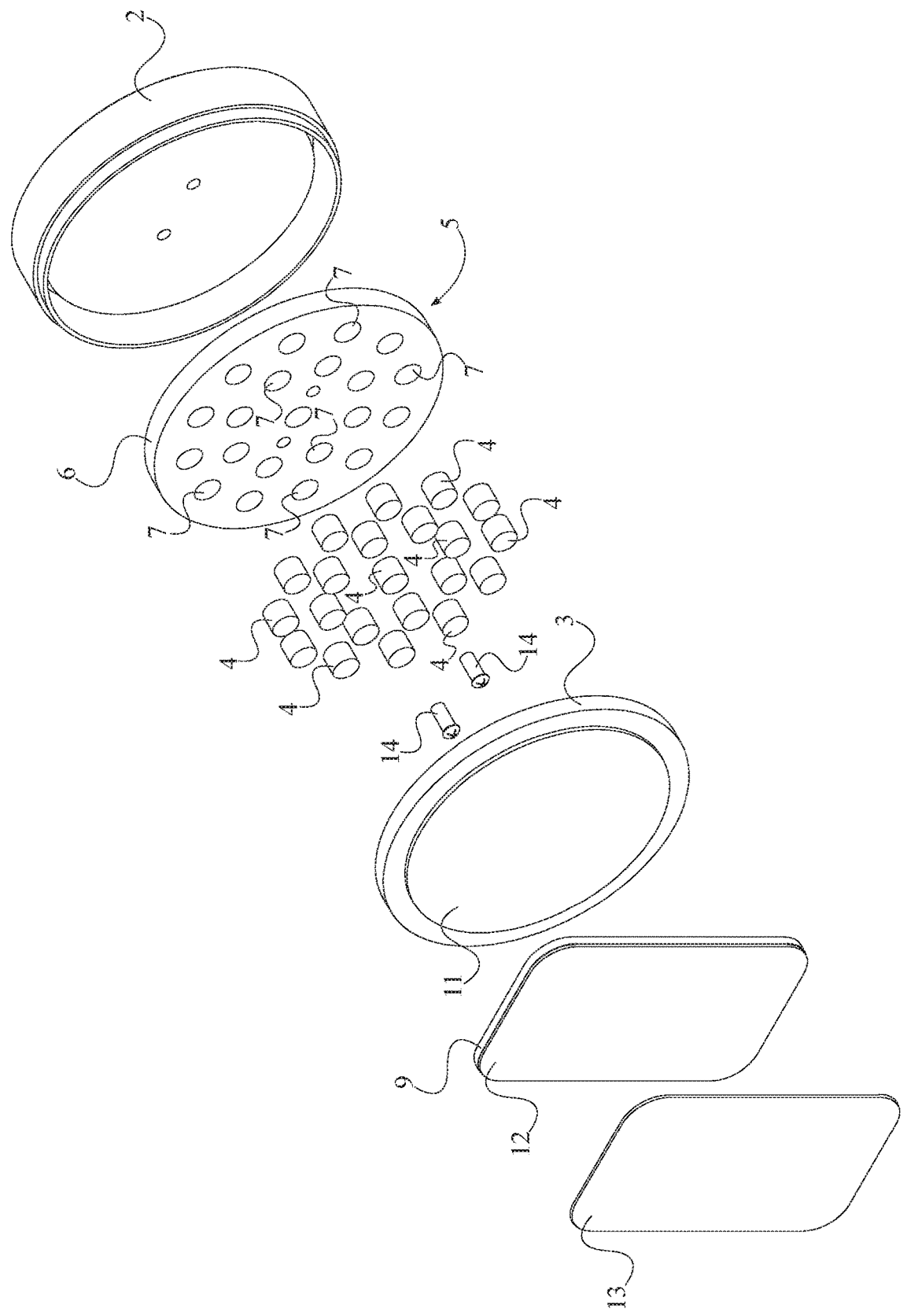
FIG. 6 is an exploded view of the present invention.

In the preferred embodiment of the present invention, the magnet-holding fixture 5 comprises a plate body 6 and at least one magnet-receiving receptacle 7, shown in FIG. 5 and FIG. 6. The plate body 6 positions the at least one magnet-receiving receptacle 7, as seen in the cross-sectional view of FIG. 5. The at least one magnet-receiving receptacle 7 houses the at least one magnet 4. More specifically, the at least one magnet-receiving receptacle 7 traverses into the plate body 6, and the at least one magnet 4 is positioned into the at least one magnet-receiving receptacle 7 so that the arrangement of the at least one magnet 4 within the casing 1 remains fixed. In order to effectively secures the magnet-holding fixture 5 within the casing 1, at least one fastener 14 traverses through the magnet-holding fixture 5 and into the base 2. More specifically, the magnet-holding fixture 5 is fixed to the base 2 by the at least one fastener 14.

The at least one magnet 4 is preferably a plurality of magnets, as seen in FIG. 6. The plurality of magnets allows a user to adjust the strength of the magnetic attraction force between the ferric plate 9 and the at least one magnet 4. The plurality of magnets is distributed across the magnet-holding fixture 5 so that the mobile device is evenly balanced about the cover 3. In order to accommodate the plurality of magnets, the at least one magnet-receiving receptacle 7 needs to be a plurality of magnet-receiving receptacles. Each of the plurality of magnets is positioned into a corresponding receptacle 7 from the at least one magnet-receiving receptacles 7 so that the arrangement of the plurality of magnets is fixed within the casing 1.

In order to prevent the casing 1 from adhering to an undesired surface, the present invention further comprises a first removable seal 10, as shown in FIG. 2 and FIG. 6. The first removable seal 10 is detachably attached across the first adhesive layer 8, opposite to the base 2, and is coextensive with the first adhesive layer 8. This arrangement covers the first adhesive layer 8 until the user wishes to adhere the casing 1 to the desired surface. Once the user peels the first removable seal 10 off the first adhesive layer 8, the user positions the first adhesive layer 8 adjacent the desired surface and presses the first adhesive layer 8 onto the desired surface in order to fix the casing 1 onto the desired surface.

Figure 3:
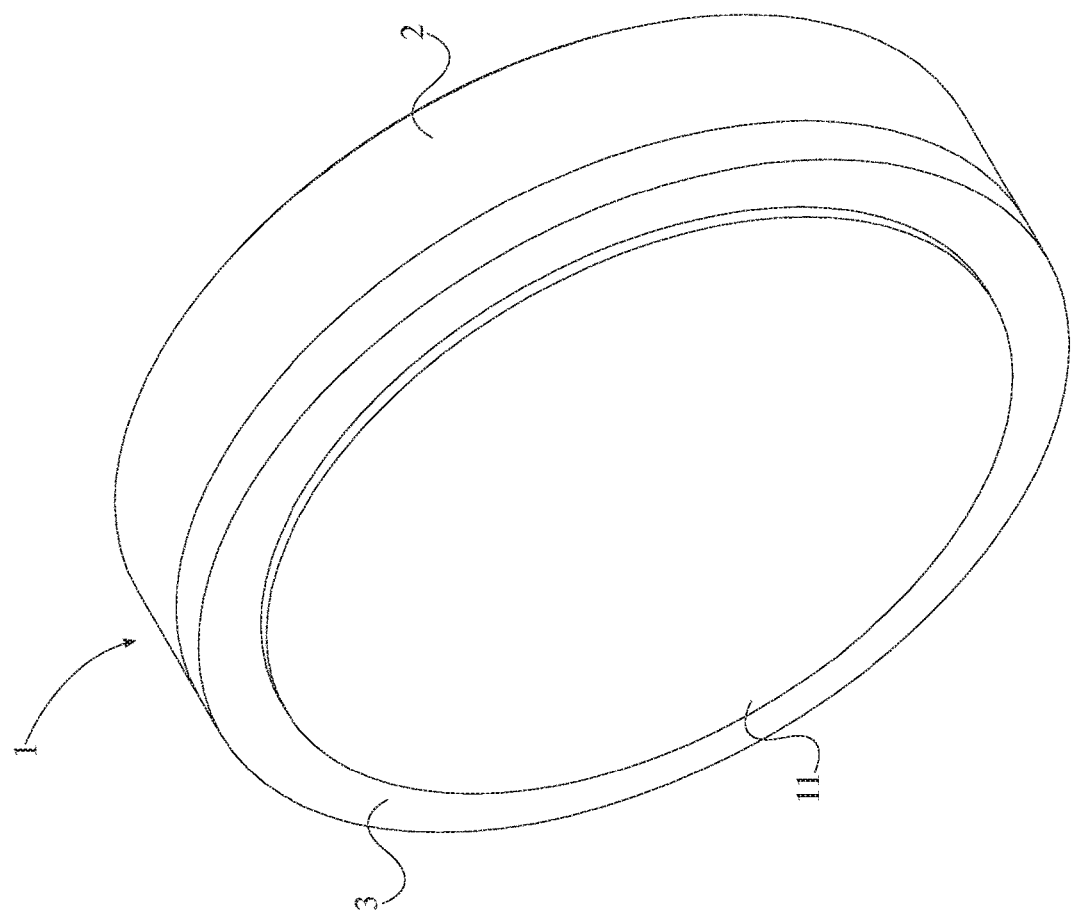
FIG. 3 is a front perspective view of the casing and the friction-inducing layer of the present invention.
Figure 4:
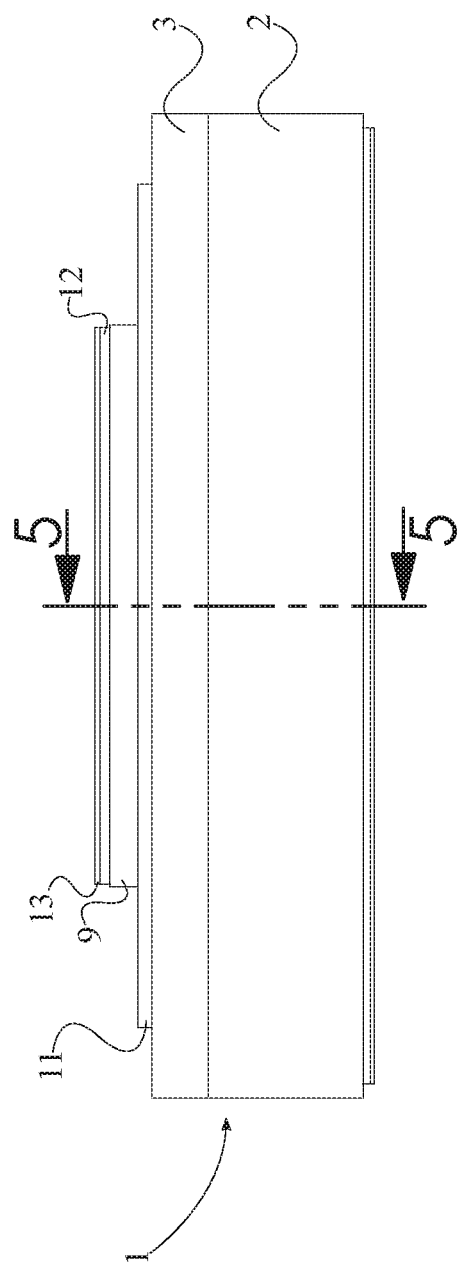
FIG. 4 is a top view of the present invention, wherein the ferric plate is magnetically coupled to the at least one magnet.

The present invention further comprises a friction-inducing layer 11. The friction-inducing layer 11 increases the friction between the ferric plate 9 the mobile device, illustrated in FIG. 3 and FIG. 4. The friction-inducing layer 11 is positioned external to the casing 1 and is connected across the cover 3 so that the ferric plate 9 and the mobile device does not easily slip past the casing 1. In the preferred embodiment of the present invention, the friction-inducing layer 11 is made of rubber.

In order to attach the ferric plate 9 onto a mobile device, the present invention further comprises a second adhesive layer 12, shown in FIG. 1 and FIG. 6. The second adhesive layer 12 is connected across the ferric plate 9 and is oriented away from the casing 1. This arrangement allows the ferric plate 9 to simultaneously press against the casing 1 while being fixed to the mobile device. In this embodiment of the present invention, a second removable seal 13 prevents the second adhesive layer 12 from adhering to an undesired surface. In order to prevent the second adhesive layer 12 from coming into contact with an undesired surface, the second removable seal 13 is coextensive with the second adhesive layer 12. The second removable seal 13 is detachably attached across the second adhesive layer 12, opposite the ferric plate 9. This arrangement covers the second adhesive layer 12 until the user wishes to adhere the ferric plate 9 on the mobile device. Once the user peels the second removable seal 13 off the second adhesive layer 12, the user positions the second adhesive layer 12 adjacent the mobile device and presses the second adhesive layer 12 onto the desired surface in order to fix the ferric plate 9 onto the mobile device.

Although the invention has been explained in relation to its preferred embodiment, it is to be understood that many other possible modifications and variations can be made without departing from the spirit and scope of the invention as hereinafter claimed.

What is claimed is:

1. A magnetic mobile device mount comprises:
   a casing comprising a base and a cover;
   at least one magnet;
   a magnet-holding fixture;
   a first adhesive layer;
   the cover being perimetrically aligned with the base;
   the cover being detachably mounted to the base;
   the magnet-holding fixture being positioned within the casing;
   the magnet-holding fixture being recessed into the base;
   the at least one magnet being mounted into the magnet-holding fixture;
   at least one fastener originating in the magnet-holding fixture and extending into the base, the at least one fastener securing the magnet-holding fixture to the base;
   whereby when the cover is mounted to the base, the cover covers the magnet-holding fixture and the at least one magnet, whereby the cover is configured to be removable by a user
   the ferric plate being magnetically coupled to the at least one magnet.

2. The magnetic mobile device mount as claimed as claim 1 comprises:
   the magnet-holding fixture comprises a plate body and at least one magnet-receiving receptacle;
   the at least one magnet-receiving receptacle traversing into the plate body; and
   the at least one magnet being positioned into the at least one magnet-receiving receptacle.

3. The magnetic mobile device mount as claimed as claim 1 comprises:
   the at least one magnet being a plurality of magnets; and
   the plurality of magnets being distributed across the magnet-holding fixture.

4. The magnetic mobile device mount as claimed as claim 3 comprises:
   the magnet-holding fixture comprises a plate body and a plurality of magnet-receiving receptacles;
   each of the plurality of magnet-receiving receptacles traversing into the plate body; and
   each of the plurality of magnets being positioned into a corresponding receptacle from the plurality of magnet-receiving receptacles.

5. The magnetic mobile device mount as claimed as claim 1 comprises:
   a first removable seal;
   the first removable seal being detachably attached across the first adhesive layer, opposite to the base; and
   the first removable seal being coextensive with the first adhesive layer.

6. The magnetic mobile device mount as claimed as claim 1 comprises:
   a friction-inducing layer;
   the friction-inducing layer being positioned external to the casing; and
   the friction-inducing layer being connected across the cover.

7. The magnetic mobile device mount as claimed as claim 6, wherein the fiction-inducing layer is made of rubber.

8. The magnetic mobile device mount as claimed as claim 1 comprises:
   a ferric plate;
   a second adhesive layer;
   the second adhesive layer being connected across the ferric plate; and the second adhesive layer being oriented away from the casing.

9. The magnetic mobile device mount as claimed as claim 8 comprises:
a second removable seal;
the second removable seal being detachably attached across the second adhesive layer, opposite to the ferric plate; and
the second removable seal being coextensive with the second adhesive layer.

* * * * *